Jan. 9, 1940.                C. M. SLOMAN ET AL                2,186,180
                                 PNEUMATIC TIRE
                             Filed April 29, 1936         4 Sheets—Sheet 1

INVENTORS
CHERI M. SLOMAN
ELLIOTT S. EWART
BY
ATTORNEY.

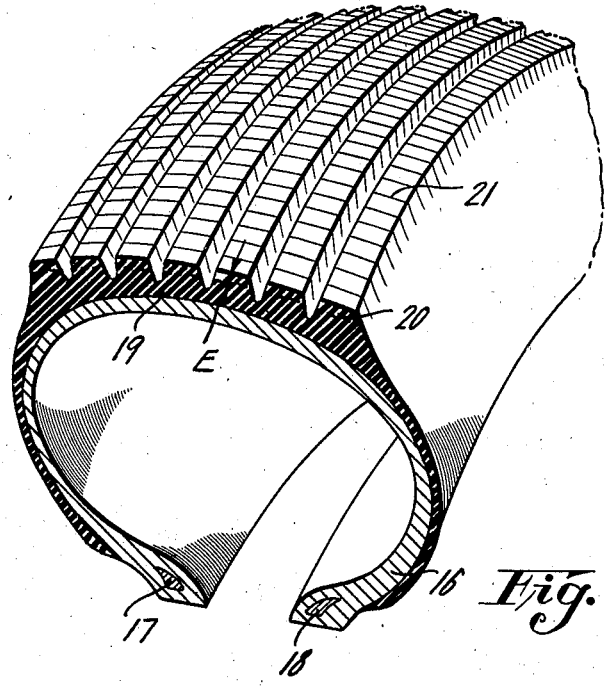
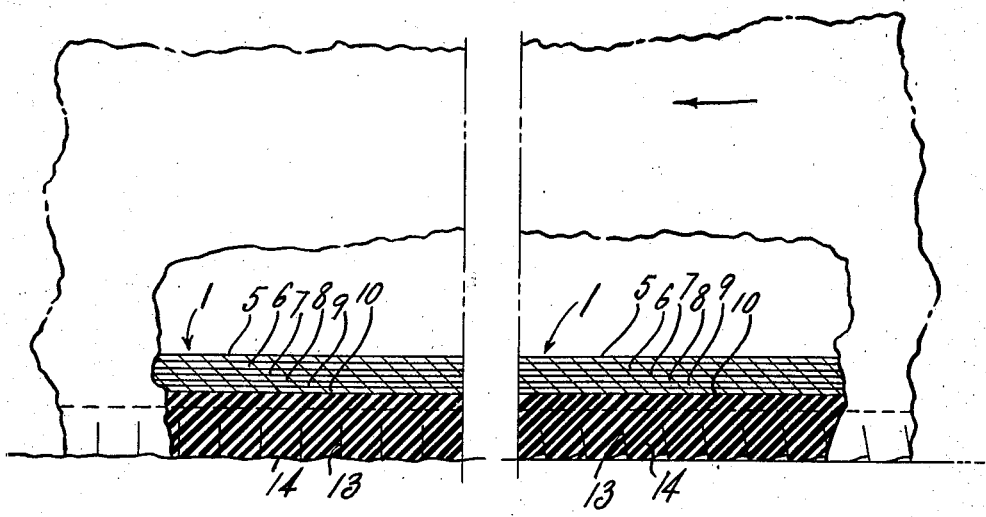

Jan. 9, 1940.  C. M. SLOMAN ET AL  2,186,180
PNEUMATIC TIRE
Filed April 29, 1936    4 Sheets-Sheet 3
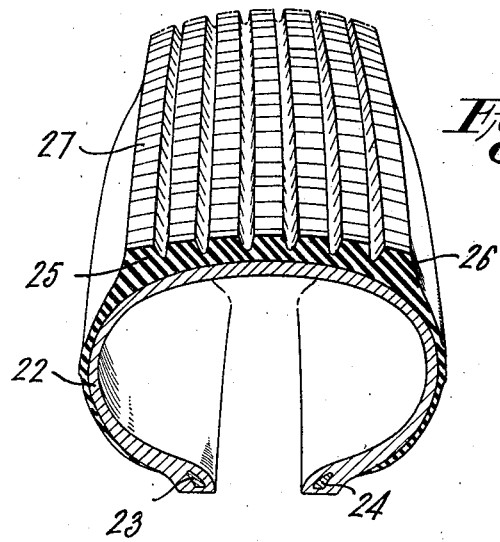
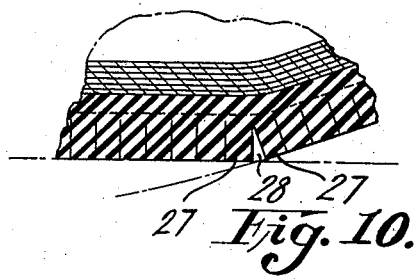
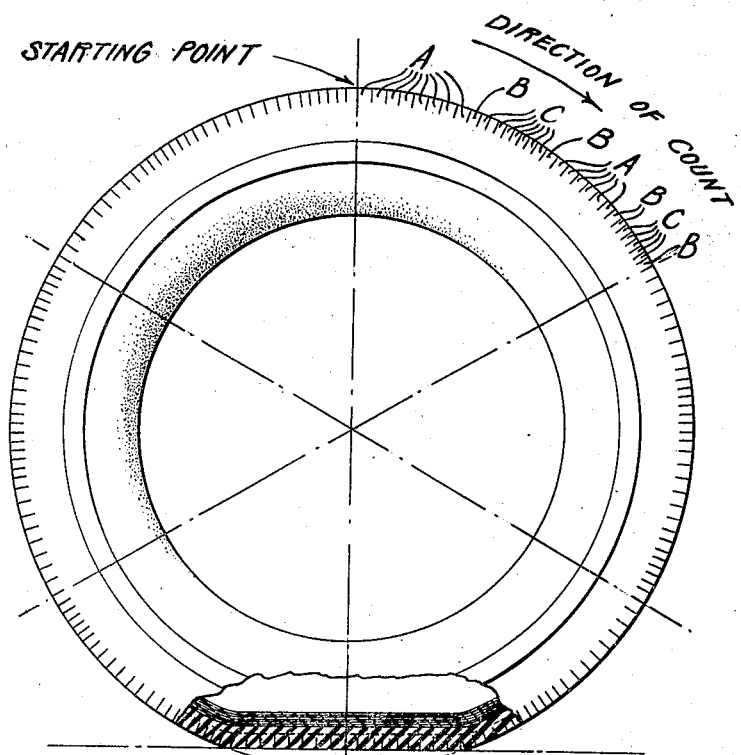
INVENTORS
CHERI M. SLOMAN
ELLIOTT S. EWART
BY
ATTORNEY.

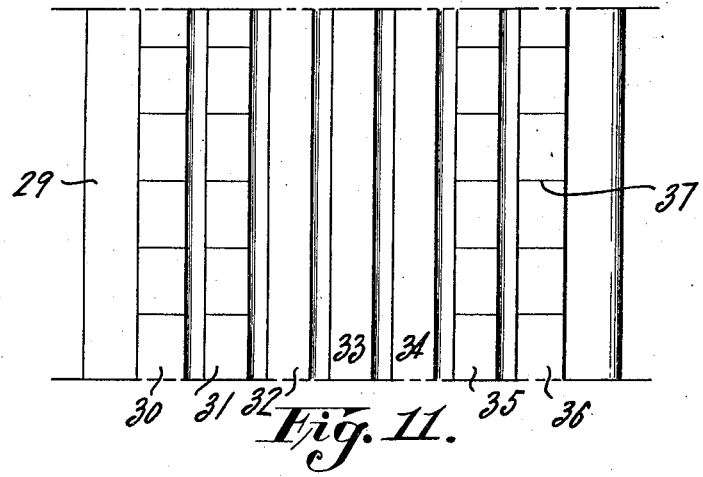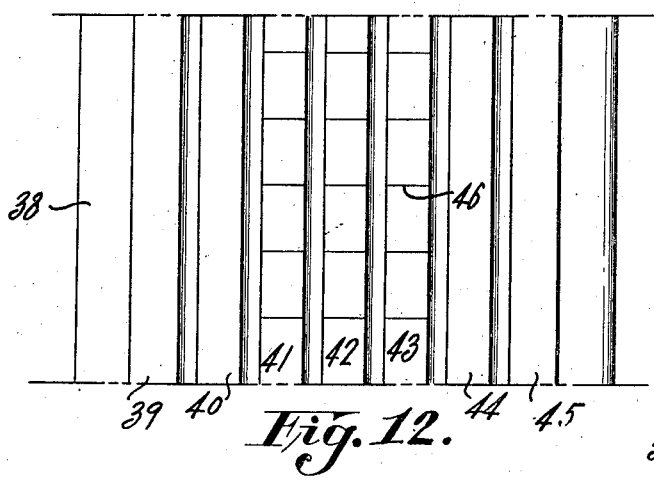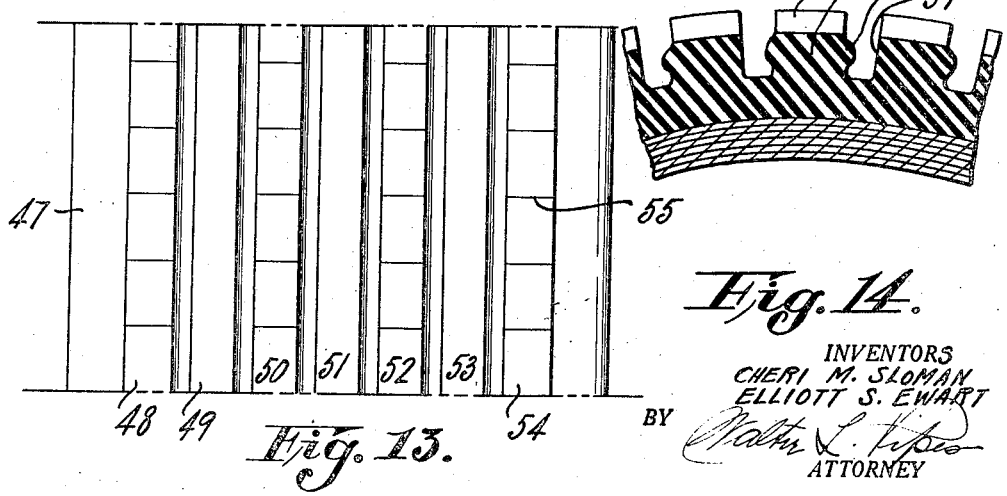

Patented Jan. 9, 1940

2,186,180

UNITED STATES PATENT OFFICE 2,186,180

PNEUMATIC TIRE

Cheri M. Sloman, Detroit, and Elliott S. Ewart, St. Clair Shores, Mich., assignors, by mesne assignments, to United States Rubber Company, New York, N. Y., a corporation of New Jersey Application April 29, 1936, Serial No. 76,914

5 Claims. (Cl. 152—209)

The invention relates to pneumatic tires, and in particular it relates to pneumatic tire treads and the treatment thereof in order to increase the efficiency of such tires while in operation. More particularly, the invention relates to a pneumatic tire having its tread or normal antiskid portion in the form of relatively narrow circumferential ribs divided by a plurality of transverse slits and to the renewal of the slits.

It is well established that tread design has very little influence on skidding on dry surfaces. When the road surface is dry, skidding is not a serious problem, and all tires having conventional treads will stop the vehicle on which they are used in practically the same distance. On wet surfaces, however, an entirely different condition exists as the tire rides on a thin film of water which acts as a lubricant and prevents the tire from engaging directly with the road surface. Due to the presence generally also of oil, dust, clay, or other foreign material which sometimes may be suspended in the water, the lubricating effect of the water is usually augmented.

In order to obtain the greatest degree of resistance to skidding, it is necessary for a tire to have a tread design or configuration which will operate to squeeze out the lubricating film of water and/or other foreign materials, and permit the tread rubber to come into actual contact with the road surface. If the tread design is made up of large blocks or design elements, the water or lubricant which is trapped beneath the blocks must move a considerable distance to escape. If the design elements are small, the lubricating film is squeezed out more rapidly, the tread rubber comes into contact with the road surface, and the resistance to skidding is increased.

An advance in the removal of a lubricant such as water from between the tread elements and the road surface, is to divide the tire tread into a greater number of circumferential units, such as by providing a greater number of narrow, circumferential ribs. A narrow rib tire has many advantageous features in itself, and is particularly applicable in combination with transverse slits.

Any lubricant which may be present between the tread and the road surface must generally be moved laterally of the tread before the tread is permitted to come into actual contact with the road surface. It is obvious, therefore, that the narrow rib tread will function with greater efficiency because of the relatively short distance which the lubricant must travel in order to be squeezed from between the tread and the road surface and into the grooves adjacent to the ribs.

Besides the non-skid and traction advantages of a narrow rib tread, an improvement is attained whereby noises incident to operation of tires are reduced. This is effected by reducing turbulence of the surrounding air by reason of the elimination of the radial spaces defining separate tread elements, thus cutting off the source of rhythmic beat of the sound producing vibrations in successive impacts of individual tread elements.

Another advantage of the narrow rib tread is that, with reference to standard practice as represented by wide ribs, it increases the number of grooves and therefore increases the cooling area of the tread rubber. This feature permits a greater dissipation of the heat generated within the tire tread, thus removing a detrimental condition normally existing in tires, particularly when operated at a high rate of speed.

In order to obtain the greatest degree of operating efficiency in tires embodying the narrow rib tread configuration, definite limitations of minimum and maximum widths of the ribs must be maintained which are described hereinafter.

It is found that the greatest degree of tire operating efficiency is attained by providing a tire having a plurality of relatively narrow, circumferential ribs, in combination with a plurality of slits extending transversely of the narrow ribs, which slits are circumferentially relatively closely spaced.

In the usual molding and vulcanizing operation in the manufacture of a pneumatic tire it is possible to form the tire tread into a great number of small antiskid elements or projections. In such case, however, the effective contact area of the tread with the road surface is reduced because of the large number of grooves or spaces required to define the antiskid elements.

It is recognized that a tire after vulcanization may have its tread laterally slotted, as by running a cutter of substantial width transversely of the tread. Such treatment of a tire tread is objectionable in that it removes a quantity of tread rubber; and, as there is a definite relation in the rate of tread wear to the road contact area of the tread, the rate of tread wear is considerably increased. Furthermore, the slotting of a tire tread produces a rough and irregular surface which is unsightly in appearance, and which creates definite noise by impacts against the road surface. In comparison, a slit tread has no material removed from the tire during the slitting operation, the slits in appearance are only slightly noticeable, yet in functional operation each individual tread element performs independently to increase resistance to skidding, assist traction, and improve tread wear.

In accordance with our invention, we slit the tread into a large number of individual antiskid elements. This slitting is accomplished in a separate operation independent of the molding and vulcanization of the tire. In this way, no vulcanized material is removed from the ground contacting area of the tread, and, therefore, the effective wearing quality of the tread is not reduced.

Where the slits are formed in a tread composed of a plurality of relatively narrow ribs, it is preferable to maintain the slits to a depth not in excess of one-half of the normal distance between the outer surface of the tread and the base of the tread grooves. In certain cases it is desirable to vary the depth of the slits at different portions of the tread, and preferably the slits should be of less depth at the central plane of the tread than they are at the shoulder regions of the tread. Such transverse slits may be provided effectively by cutting the tread transversely and in an arcuate path, which path defines a smaller radius than the radius of the crown or transverse profile of the tread.

When the tread of a tire is worn down to a point where the slits are of no further effect, the tire may be subjected to an additional slitting operation. Subsequent re-slitting of the tread will improve the tire in operation in that it will regain all the advantages of traction obtained with the original slit formation.

By reason of the multiplicity of small individual tread elements, an improvement in tread wear is found. It is well known that, at certain portions of the tread lying in contact with the road surface, there is a relative movement between the tread and the road surface. That portion of the tread which is in contact with the road surface is directly under load, and therefore any relative movement between the tread and the road surface results in abrasion or scuffing of the tread. The multiplicity of individual tread elements produced by the slitting operation permits each individual element to bend and adjust itself in accordance with the applied load and with any variation in relative movement between the tread and road surface. As a result, tread abrasion is reduced to a minimum, thus accounting for a substantial improvement in tread wear.

The efficiency of a tread may be increased in accordance with the number of slits cut into the tread; the greater the number of slits, the greater will be the efficiency. There are certain limitations, however, which determine the maximum and minimum distances between the slits.

The spacing of the slits in various circumferential distances is desirable in order to attain quiet tire performance. It is well known that tires having a tread composed of separated individual traction elements produce noises of definite pitch when in operation, due to the impact of the traction elements with the road surface. Such impacts set up definite noises which in pitch and degree are relatively dependent upon the length and size of the traction elements and the speed of rotation of the tire. A tire having a plain or rib tread is most desirable so far as the noise characteristic is concerned, as it produces a noise which is low in degree and without pitch.

In this invention the circumferential ribs, notwithstanding transverse slits, are substantially functionally continuous. Therefore, in so far as impact noise of individual tread elements is concerned, the noise is not appreciable as each circumferential rib functions substantially as a continuous rib. However, if the transverse slits are spaced at regular intervals, a noise of definite pitch does occur which noise is not attributed to the impact of the individual tread elements as they engage with the road surface. The noise produced is believed to be caused by the snapping action of one individual tread element against an adjacent element, at a point where the tread elements leave contact with the road surface. This impinging action of one tread element against another produces a sound of definite pitch. Therefore, by varying the circumferential distances between slits, the resultant pitch of the noise produced by the impinging action of the individual elements is substantially reduced. Therefore certain of the circumferential distances between slits are preferably varied so as to form a plurality of individual tread elements, at least some of which are of different circumferential lengths. A combination of these successive units forms a group of elements, which group is repeated several times around the circumference of the tire, but each group is of such circumferential length that it occupies an arc of definite length on the tire circumference in order to diminish the pitch of the noises produced by a repetition of successive group noises.

It is, therefore, an object of the invention to provide a pneumatic tire with a tread having slits defining individual tread elements, which slits are spaced apart a distance suitable to attain the greatest degree of tread operating efficiency consistent with practical tire operating conditions. While we have illustrated traction elements in the form of ribs, it is obvious that certain of the features of the invention are independent of the exact tread configuration and may be applied to other tread configurations.

The advantages obtained in the practice of the invention are, first, that resistance to skidding is increased; second, traction is increased; third, the wearing quality of the tire is improved; and fourth, the tire is quiet in operation.

These objects and advantages will appear more fully in the following detailed description, when considered in connection with the accompanying drawings illustrating a present preferred embodiment of the invention, in which:

Fig. 1 is a transverse view, in section and in perspective, of a portion of a pneumatic tire embodying our invention;

Figs. 2, 3, and 4 are enlarged transverse fragmentary views, in section, of portions of a tire tread showing various stages of tread slitting;

Fig. 5 is a transverse view, in section and in perspective, of a modified embodiment of the invention, illustrating the application of slits of uniform depth;

Fig. 6 is a side elevational view, partly in section, of a portion of a pneumatic tire embodying the invention in contact with a road surface;

Fig. 7 is a similar view, illustrating the function of the traction elements when influenced by a braking or an accelerating action;

Fig. 8 is a transverse view, in section and in perspective, of a modified embodiment of the invention, illustrating a portion of a tire tread having slits variably spaced;

Fig. 9 is a side elevational view, in partial section of a tire provided with transverse slits variably spaced;

Fig. 10 is an enlarged view, in section, of a portion of the tire illustrated in Fig. 9;

Figs. 11, 12, and 13 are plan views of portions of tire treads illustrating the application of slits to certain of the tread ribs; and Fig. 14 is an enlarged view in section of a portion of a tire illustrating a further modification of the invention.

Figure 1:
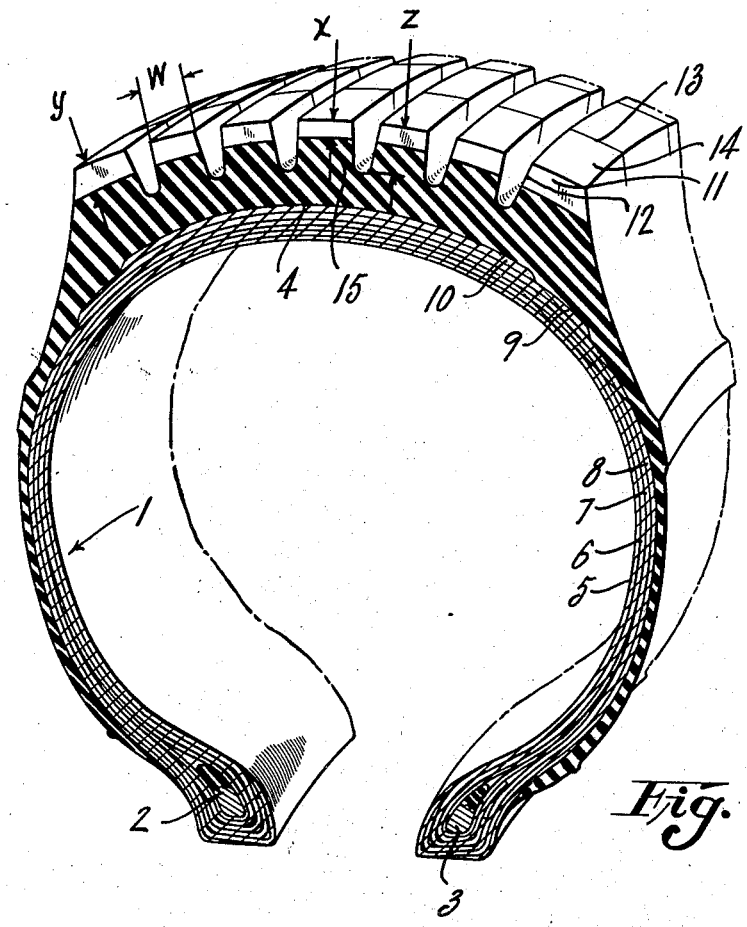

Referring to the drawings, Fig. 1 illustrates a pneumatic tire, conventional in most respects, and comprising a carcass 1 of strain resisting elements, preferably cord fabric, inextensible bead elements 2 and 3, and a tread 4. The components of the carcass are exemplified by plies 5, 6, 7, and 8, and breaker plies 9 and 10. In the preferred embodiment of this invention the tread 4 comprises a plurality of ribs 11 and defining grooves 12. However, the tread 4 may be in the form of various designs of antiskid elements or configurations, and certain of the improved features of our invention may be applied to such treads with substantial effectiveness, regardless of the tread design.

It is well known that a tread of rib formation is relatively quiet in operation, and therefore it is particularly adaptable in combination with our method of tread treatment. The highest degree of operating efficiency of substantially continuous, circumferential ribs is obtained by providing definite proportions of rib width relative to the cross sectional width of the tire. In order to increase traction and resistance to skidding, the greater part of the lubricant such as water must be moved laterally of the ribs at the road contacting area of the tread. Therefore, the ribs should be relatively narrow. There are, however, certain limitations which determine the minimum width of the tread ribs in order to attain the highest degree of practical operating efficiency. Where the ribs are excessively narrow they lose their stability, particularly when the vehicle on which the tires are mounted subjects the tires to greater than normal directional or lateral strains. This may occur when the brakes of the vehicle are suddenly applied, where the vehicle skids laterally, or when the vehicle negotiates curves at relatively high speeds. In such cases excessively narrow ribs bend over laterally or become otherwise distorted, resulting in an unstable or improper operating functioning of the tread.

An important additional factor in the choice of the most favorable width of rib is the fact that when the ribs are too narrow the grooves between the ribs are completely closed where the tire contacts the road. In such a case the grooves are no longer able to function as passages for the escape of the lubricating film responsible for skidding. Accordingly, the rib width must be such that sufficient stability is obtained to prevent the grooves from closing during the road contact, thus retaining the necessary passages for the escape of liquids.

Experiments have indicated that the minimum width of the ribs should not be less that 3 percent of the normal maximum width of the tire in cross section on a transverse radial plane. The maximum width of the rib should not exceed 8 percent of the normal width of the tire in cross section. Where the width of the ribs is greater than 8 percent they proportionately lose their efficiency in functioning to move the lubricant laterally of the ribs. The rib width is indicated by the dimension W, shown in Fig. 1 of the drawings, representing a width of 3 percent to 8 percent of the normal width of the tire in cross section. As the walls of the ribs are tapered, it is understood that the dimension W represents the average width of the rib.

In the more common size of passenger car tires, and in particular the sizes having a cross sectional width of from 6.00 to 7.50, we prefer that the tread configuration be so formed as to provide at least seven continuous ribs, each rib having a width within the minimum and maximum limitations hereinbefore designated.

After the tire is vulcanized with the desired rib or other tread formation, it is subjected to a slitting operation which produces cuts 13 extending transversely through the ribs 11. These cuts may be produced by any form of cutting tool, such as a knife or a thin rotary cutter. The important feature of the slitting operation is that no substantial amount of material or tread rubber be removed from the tread.

The slitting operation results in the formation of a plurality of individual antiskid elements 14. The slits 13 do not form any appreciable distance between the individual antiskid elements 14, and therefore each individual elements 14 rests against the adjacent elements to produce a plurality of successive, independent elements in close relationship, so as to form in effect a continuous rib. The slits 13 may extend in depth to about the bottom of the grooves 12. We prefer, however, that the slits initially extend in depth to about one-third to one-half of the total depth of the grooves 12, and be renewed as the tread wears down.

While it is desirable to form the slits as deeply as possible into the antiskid or wearing portion of the tread, it is found necessary to restrict the depth of the slits in at least certain portions of the tread. Deep slits increase the tendency to tread cracking at their bases. This is probably due to the greater leverage effect produced at the point of support of the individual tread elements when resistance strains from braking or acceleration are imposed at the road contacting surface of the elements.

The central portion or the central ribs of the tread are subjected to a greater load than the outer or shoulder portions or ribs. Therefore, in order to attain the maximum degree of efficiency it is preferable to provide transverse slits which are less in depth at the central ribs and greater in depth at the shoulder ribs. A desirable and practical method of attaining this condition is to form the slits in the tread in an arcuate path having a radius less than the radius of the crown or transverse profile of the tread. The preferred depth of the slits at the central plane of the tire is about one-third of the total height of the tread elements, the height of the elements being determined by the depth of the grooves defining the ribs. At the shoulder ribs of the tread the slits may extend in depth to about one-half of the height of the tread elements. These proportions refer to a new or substantially new tire.

Fig. 1 illustrates a rib tire having its ribs transversely slit to a depth represented by the dimension characters X and Y. The character Z indicates the total height of the tread elements. The depth dimension X, being at the central plane of the tread, is equivalent to one-third of the total height Z, and the depth dimension Y is equivalent to one-half of the height Z. As the paths of the slits are radial, the ribs intermediate the central and shoulder ribs are cut to a depth between the minimum and maximum depth limitations. According to this method of cutting the tread, the variable depth of the slits is such that a proper relative proportion is maintained between the depth of the slits and the load sustained by the various ribs of the tread.

Figure 2:
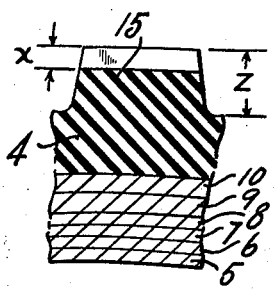
Figure 3:
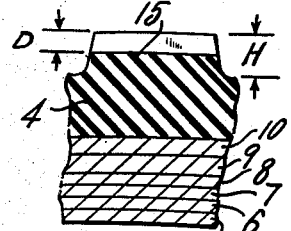
Figure 4:
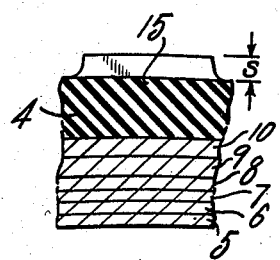

After the tread wears down, the effectiveness of the slit formation is reduced. In Figs. 2, 3, and 4 there are comparative views illustrating different stages of tread wear together with the relative proportions of the depth of slits produced in subsequent re-slitting operations.

Fig. 2 illustrates a portion of the tire shown in Fig. 1, including in particular the central rib of the tire designated as rib 15. As previously described, with reference to Fig. 1, the height of the rib or antiskid element shown in Fig. 2 is represented by Z and the depth of the slit which is equal to one-third of the height Z is represented by the character X.

Fig. 3 is a view similar to Fig. 2, except that the tread is shown worn down to about the base of the original slits. The remaining height of the tread elements is designated by the character H which, in comparison with Fig. 2, is equivalent to the height Z less the depth X. In other words, one-third of the rib height has been worn down by abrasion. When a tire of our invention reaches this stage through use, the original slitting formation is no longer effective, and it is desirable to re-slit the tread in order to regain the advantages obtained by the slit formation. In such case, the depth D of the slits formed in the tread in the re-slitting operation may be equal to the depth X or the original depth of the slits. The proportions of the depth of the slit to the height of the rib of the second operation shown in Fig. 3 vary from the original proportions shown in Fig. 2. In the re-slitting operation the depth of the slit D may be equal to one-half of the height H.

When the effectiveness of the slits is again reduced, due to the wearing of the tread to about the base of the slit as shown in Fig. 3, additional re-slitting of the tread is necessary in order to regain the advantages of the invention. This condition is shown in Fig. 4 which, in comparison with Figs. 2 and 3, indicates that the tread has been worn down to a point where the height of the antiskid element represented by S is equal to about one-half of the height H shown in Fig. 3 and one-third of the height Z shown in Fig. 2.

In the last re-slitting operation, shown in Fig. 4, the depth of the slits may be equal to the height S of the antiskid elements.

While the foregoing is illustrative of a preferred practice of the invention, it is to be understood that after the original slitting operation the tread may be re-slit at various stages of wear throughout the life of the tire, and the slits may be of various depths with a substantial increase in the efficiency of the tire and any such variations in the depth of slits at different stages of the tire wear is contemplated within the scope of the invention.

The spacing or circumferential distance between successive slits is of considerable importance. In order to obtain the greatest degree of operating efficiency it is desirable to place the slits relatively close. Tests have demonstrated that when the slits are spaced too closely there is a tendency for the individual tread elements to chip or break off; and the more severe the operating conditions, the greater the spacing required. Furthermore, the individual tread elements, if less than 0.3 inch in circumferential length, tend to lose their stability as support for the tire. In other words, they become bent and distorted so that their road engaging surfaces are not maintained in substantial parallelism with the road surface. On the other hand, when the slits are spaced relatively far apart, their effectiveness in reducing abrasion is materially reduced. The advantageous features of our improved tire are, therefore, best represented by transversely slit treads, which slits are transversely spaced a minimum distance of 0.3 inch, and a maximum distance of about 1.25 inches.

Fig. 5 shows a portion of a pneumatic tire, in section and in perspective, including a carcass 16, inextensible beads 17 and 18, and a tread 19. The wearing portion of the tread is divided into a plurality of ribs 20 having slits 21 extending transversely therethrough. The depth of the slits is represented by the dimension character E, and it will be noted that this depth is uniform in its distance relative to the radius of the crown or transverse profile of the tread. This modification shows that the effectiveness of the invention may be substantially attained by maintaining a uniform depth of the slits.

Fig. 6 shows a portion of a pneumatic tire, partly in section, in contact with a road surface. This view is representative of any of the modified forms of slit treads herein described, and for purposes of identification of its components it may be considered as a tire similar to that shown in Fig. 1. When a tire rests upon a road surface, that portion of the tread which supports the tire is under compression. Therefore, by slitting the tread in accordance with our invention each individual tread element is more adaptable to adjust itself to the surface of the road. Where the road surface is irregular, such as shown in Fig. 6, each individual tread element is free to adjust itself; consequently, instead of bridging small depressions in the roadway, the individual elements will conform more closely with the irregularities in the road surface. This feature is important in that it gives better distribution of the supporting load over a greater area of road surface. In this way it prevents certain portions of the tread from assuming the greater share of the supporting load, and as a result the wearing quality of the tread is increased.

The wearing quality of the tread is further improved by the relatively small individual tread elements being capable of individual adjustment. Due to this readily adjustable feature, the tread elements are less susceptible to abrading or scuffing action produced by road contact.

Normally the outer surface of the tread forms an unbroken road engaging surface, notwithstanding its multiplicity of slits. However, when the brakes on a vehicle carrying the tires are applied, the individual tread elements are subjected to a strain which causes them to be positioned at an angle varying slightly from the normal right angular position relative to the road surface. This condition is shown in particular in Fig. 7, where for purposes of explanation, it may be assumed that the wheel carrying the tire is locked, and that the tire is sliding along the pavement or road surface in the direction indicated by the arrow. Under such conditions the individual tread elements become angularly positioned in such manner that a multiplicity of edges engage with the road surface.

When the road surface is covered with a film of water or other lubricant, the multiplicity of edges of the individual tread elements tend to scrape away the lubricant so that the tread rubber comes into direct contact with the road surface. When the individual tread elements are thus angularly disposed, two advantageous functions follow. The leading edges of the individual tread elements scrape the road surface of the lubricating film, and at the same time the trailing edges of the elements are raised slightly from the road surface, thus forming a space into which the lubricating film may be deposited, or through which it can escape to the circumferential grooves. As a general rule, most of the lubricating film will be moved laterally of the individual elements. Therefore, the film will be deposited at areas such as within the grooves 12 forming the sidewalls of the ribs 11. However, the resistance to skidding is substantially increased by reason of the provision wherein minute quantities of lubricating film are removed from the road surface and deposited at the trailing edge of the individual tread elements which do not support the tire load. The lubricant removed by the leading edges of the individual tread elements is pushed ahead into the opening formed at the trailing edge of the preceding tread elements.

A tire that functions efficiently must be quiet in operation. It is, therefore, essential that the transverse slits should be so spaced that they will form individual tread elements which vary in circumferential length.

An illustration of this embodiment is shown in Fig. 8 by a tire having a carcass 22, inextensible bead elements 23 and 24, and a tread 25 carrying antiskid configurations in the form of circumferential ribs 26. Each rib 26 is transversely slit so as to form a plurality of individual tread elements 27 which vary in circumferential length.

A portion of a tire in longitudinal section, showing the relative position of the tire with a road surface is shown in Fig. 10, wherein the arrow indicates the direction of rotation of the tire. As the tire leaves contact with the road surface, the individual tread elements 27 separate so as to form wedge-shaped openings 28 between the individual elements 27. As the tire rotates, and at that location where the tread leaves contact with the road surface, each succeeding tread element 27 snaps against the preceding tread element, resulting in the creation of a definite noise.

It has been found that where all of the individual tread elements are of the same circumferential length, the noise produced by successive impacts of one tread element against another produces an objectionable noise of definite pitch. For example, a 6.50—17 tire, having a circumferential series of about 180 circumferential slits or individual tread elements, driven at the rate of 30 miles per hour, causes a frequency of impulses in excess of one thousand cycles per second, thus producing a sound value well within the range of audibility.

A purpose of this invention is to slit the tread in such manner as to form blocks of variable length, and thus to eliminate the pitch characteristics of the sound of a point where it is no longer objectionable. In order to accomplish this, it is found that the circumference of the tread may be divided into groups, each group containing a plurality of individual tread elements of which at least some are of different length. It is found advantageous for each group to form a combined arc of individual tread elements equal in length to about one-sixth of the circumference of the tire.

Fig. 9 illustrates a preferred arrangement for spacing the slits. This arrangement, beginning at the starting point and proceeding in the direction of count, includes tread elements of the lengths A, B, and C; of which there are eight A's, one B, seven C's, one B, six A's, two B's, five C's, one B. As an example of the relative proportions of the spacing arrangement of each group, the following table gives the mathematical values of a practical embodiment:

| | |
|---|---|
| A—.625″ | B—.375″ |
| A—.625″ | A—.625″ |
| A—.625″ | A—.625″ |
| A—.625″ | A—.625″ |
| A—.625″ | A—.625″ |
| A—.625″ | A—.625″ |
| A—.625″ | A—.625″ |
| A—.625″ | A—.625″ |
| A—.625″ | B—.375″ |
| B—.375″ | B—.375″ |
| C—.500″ | C—.500″ |
| C—.500″ | C—.500″ |
| C—.500″ | C—.500″ |
| C—.500″ | C—.500″ |
| C—.500″ | C—.500″ |
| C—.500″ | B—.375″ |
| C—.500″ | |

A spacing arrangement such as this operates efficiently in dispelling the pitch of the noises resulting from impacts of individual tread elements. However, it is to be understood that various other group arrangements within the spacing limitations of .3 inch to 1.25 inches will operate with substantially equal effect.

The combined impulses of groups of the individual tread elements are apt to produce a group noise of definite pitch unless the group is of sufficient arcuate length. For this reason, we prefer that the group length should be equal to, or exceed, an arc forming at least one-sixth of the circumference of the tire. A 6.50—17 tire driven at the rate of 30 miles per hour revolves 5.8 times per second. Where the tire is divided into a group of tread elements equal to one-sixth of the circumference, the group impulses per second are 34.8. When about 30 impulses per second are reached, a continuous, low frequency note is produced. However, the frequency of sound must reach about 64 cycles per second before producing a substantial stimulation of the auditory sense. Thus, the noise produced by group impulses under normal driving speeds is of such low frequency as to be incapable of objectionable registration by a human ear. Therefore the disposition of the tread elements within each group functions to produce dissimilar sound producing vibrations, while the sound impulses produced by a series of groups of tread elements may produce a continuous note but of such low frequency that it is generally imperceptible.

Preferably, the slits 13 should extend transversely of the tread and should include all of the configuration of the tread. In certain cases it may be preferable to slit only certain of the ribs. For example, it may be preferable to slit only the center and intermediate ribs, leaving the outer or shoulder ribs uncut. We, therefore, contemplate within the scope of the invention the slitting of all or part of the tread configurations which normally comprise the tread of conventional tires.

These modifications are shown in Figs. 11, 12, and 13. Fig. 11 shows a plan view of a tire 29 having a plurality of ribs 30, 31, 32, 33, 34, 35, and 36. In this modification slits 37 are cut into the outer ribs only, such as ribs 30, 31, 35, and 36, leaving the three central ribs 32, 33, and 34 uncut.

In Fig. 12 a reverse formation is illustrated, wherein a tire 38 having a plurality of ribs 39 to 45, inclusive, has transverse slits 46 extending through the central ribs only, such as ribs 41, 42, and 43. In this arrangement the outer ribs 39, 40, 44, and 45 remain uncut. A still further modification is shown in Fig. 13 which illustrates a tire 47 having a plurality of ribs 48 to 54, inclusive. Transverse slits 55 are cut into alternate ribs as 48, 50, 52, and 54, and ribs 49, 51, and 53 remain uncut. Also the ribs may be provided with incomplete slits extending in from the lateral edges thereof in aligned or staggered relation, if desired. From these modifications it is obvious that various degrees of effectiveness of the slit rib combination may be attained by application of the slits to certain of the ribs.

Fig. 14 illustrates a further modification of the invention in which ribs 55 are provided with one or more lateral projections 56 extending into the adjacent grooves 57 to exclude stones may be provided with slits 58.

Actual road tests have shown that the narrow rib tire has definite merit in comparison with a conventional tire having antiskid projections of considerable areas, and that the transversely slit, rib tire has definite merit in comparison with the plain rib tire. In comparing the narrow rib tire with a tire of conventional design, that is, a design bearing a configuration of both circumferential ribs and tread buttons, a definite improvement is noted when stopping the vehicle with wheels locked. Three directional skid tests on wet, clay coated pavement indicated an average rating of 128 percent on the narrow rib tire, based on a rating of 100 percent for the conventional tire.

Lateral skid tests, i. e., skidding perpendicular to the direction of motion, were also conducted. This consisted of driving a vehicle in an arcuate path at a definite velocity. The rating of lateral skidding of the conventional tire was set as an average of 100 percent, whereas the narrow rib tire showed a performance rating 130 percent.

While the foregoing tests relate to a lubricant such as wet clay, further tests have shown that various other loose materials supported by a hard foundation also show definite advantages in favor of the narrow rib tread. For example, again assuming the 100 percent rating for the conventional tire on directional skid tests, the improved rib tire showed an average rating of 126 percent on tests conducted in soft and slushy snow; 119 percent on soft snow; 108 percent on packed snow; and 105 percent on very hard, packed snow. The narrow rib tread also showed an advantage in lateral tests on soft snow to the extent of 150 percent.

Assuming now that the seven row rib tire is equivalent to a rating of 100 percent, tests have shown substantial advantages in favor of slitting the narrow rib tread. It was found that a tire treated in accordance with this invention shows a rating of 230 percent when tested on a road of wet asphalt with a thin coating of snow. On loose snow about two inches deep, a rating of 113 percent has been recorded, and on clean, wet asphalt, the rating is 118 percent. On an inclined roadway covered with loose snow about five inches deep, the improved tire indicated a rating of 258 percent, while on a wet clay inclined road surface a rating of 104 percent has been indicated.

In addition to the foregoing, the tire having the improved features of this invention indicates that it is 18 percent superior to the regular treads in respect to antiskid tread wear.

Accordingly we have provided an improved automobile tire, particularly of the pneumatic type, in which the antiskid configuration of the tread is made so that the tire has improved resistance to skidding, traction qualities and wearing qualities, and at the same time the tire is quiet in operation. While we have described the invention as particularly applicable to a tire tread configuration having a plurality of relatively narrow ribs which are provided with slits formed without the removal of any of the tread composition, it is obvious that certain of the features of the invention are independent of the exact configuration given to the tire tread and may be applied to other antiskid configurations or projections.

While we have shown and described a present preferred embodiment of our invention, it is to be understood that the invention may be otherwise embodied and practiced within the spirit of the invention and the scope of the appended claims.

Having thus described our invention, what we claim and desire to protect by Letters Patent is:

1. A pneumatic tire comprising a carcass of strain resisting elements and a body of tread rubber composition, the road engaging surface of said tread composition being provided with grooves defining a plurality of antiskid projections, said projections being slit without the removal of substantially any of the rubber composition, said slits being deeper in the region of the shoulder portions than at the center portion of the tread.

2. A pneumatic tire comprising a carcass of strain resisting elements and a body of tread rubber composition, the road engaging surface of said tread composition being provided with grooves defining a plurality of circumferentially extending functionally continuous ribs of a mean width of from three to eight percent of the maximum cross sectional diameter of the tire on a transverse radial plane, some of said ribs being interrupted by slits formed without the removal of substantially any of the rubber composition, said slits being deeper in the region of the shoulder portions than at the center portion of the tread, whereby an effective traction grip on the road surface is obtained.

3. A pneumatic tire comprising a carcass of strain resisting elements and a body of tread rubber composition, the road engaging surface of said tread composition being provided with grooves defining a plurality of circumferentially extending functionally continuous ribs of a mean width of from three to eight percent of the maximum cross sectional diameter of the tire on a transverse radial plane, some of said ribs being interrupted by slits formed without the removal of substantially any of the rubber composition at variable intervals circumferentially and being deeper at the tread shoulders than at the tread center, whereby an effective traction grip on the road surface is obtained without objectionable sound.

4. A pneumatic tire comprising a carcass of strain resisting elements and a body of tread rubber composition, the road engaging surface of said tread composition being provided with grooves defining at least seven circumferentially extending functionally continuous ribs of a mean width of from three to eight percent of the maximum cross sectional diameter of the tire on a transverse radial plane, at least some of said ribs being interrupted by slits formed without the removal of substantially any of the rubber composition, said slits being of a depth at the tread center of the order of one-third of the adjacent tread groove depth and of a depth at the tread shoulders of the order of one-half of the tread groove depth, whereby the ribs have an effective traction grip on the road surface.

5. A pneumatic tire comprising a carcass of strain resisting elements and a body of tread rubber composition, the road engaging surface of said tread composition being provided with grooves defining at least seven circumferentially extending functionally continuous ribs, of a mean width of from three to eight percent of the maximum cross sectional diameter of the tire on a transverse radial plane, at least some of said ribs being interrupted by slits formed without the removal of substantially any of the rubber composition at variable sound controlling distances, said slits being of a depth at the tread center of the order of one-third of the adjacent tread groove depth and of a depth at the tread shoulders of the order of one-half of the tread groove depth, whereby the ribs have an effective traction grip on the road surface.

CHERI M. SLOMAN.
ELLIOTT S. EWART.